United States Patent [19]
Pott

[11] Patent Number: 5,992,142
[45] Date of Patent: Nov. 30, 1999

[54] NO EXHAUST EMISSION CONTROL METHOD AND ARRANGEMENT

[75] Inventor: Ekkehard Pott, Gifhorn, Germany

[73] Assignee: Volkswagen AG, Wolfsburg, Germany

[21] Appl. No.: 09/270,020

[22] Filed: Mar. 16, 1999

Related U.S. Application Data

[63] Continuation of application No. PCT/EP97/05268, Sep. 25, 1997.

[30] Foreign Application Priority Data

Sep. 28, 1996 [DE] Germany ............................ 196 40 161

[51] Int. Cl.[6] ........................................................ F01N 3/00
[52] U.S. Cl. .................................. 60/274; 60/278; 60/301; 60/285; 422/170; 422/171; 422/177; 423/213.7; 423/213.2
[58] Field of Search .............................. 60/274, 278, 299, 60/301, 285; 422/171, 177, 180, 170; 423/213.2, 213.5, 213.7

[56] References Cited

U.S. PATENT DOCUMENTS 4,755,499  7/1988  Neal et al. .
5,155,994  10/1992  Muraki et al. ............................ 60/275
5,233,830  8/1993  Takeshima et al. ...................... 60/278
5,362,463  11/1994  Stiles et al. .
5,402,641  4/1995  Katoh et al. .
5,406,790  4/1995  Hirato et al. .
5,412,945  5/1995  Katoh et al. .
5,433,074  7/1995  Seto et al. .
5,448,887  9/1995  Takeshima .
5,471,836  12/1995  Takeshima et al. .
5,473,887  12/1995  Takeshima et al. .
5,556,604  9/1996  Zahn et al. ............................ 423/213.7
5,753,580  5/1998  Hayashi et al. ........................ 502/304
5,849,254  12/1998  Suzuki et al. ........................ 423/213.5

FOREIGN PATENT DOCUMENTS 0664147  1/1995  European Pat. Off. .
2290488  1/1996  United Kingdom .

*Primary Examiner*—Thomas Denion
*Assistant Examiner*—Binh Tran
*Attorney, Agent, or Firm*—Baker & Botts, L.L.P.

[57] ABSTRACT

$NO_X$ conversion of exhaust gases from lean mixture engines such as Diesel engines is improved by providing a catalytic converter having three zones, the first zone containing an $NO_X$ storage material on a γ-aluminum oxide layer, the second zone having a layer with a noble metal, and the third zone containing an oxygen storage layer.

37 Claims, 4 Drawing Sheets

NO EXHAUST EMISSION CONTROL METHOD AND ARRANGEMENT

REFERENCE TO RELATED APPLICATION

This application is a continuation of International Application No. PCT/EP97/05268 filed Sep. 25, 1997.

BACKGROUND OF THE INVENTION

This invention relates to methods and arrangements for $NO_X$ exhaust emission control for internal combustion engines.

As used herein in connection with gas storage catalysts, the term "absorb" includes the chemical process for storing gases such as, for example, by conversion of barium oxide to barium nitrate for storage of nitrogen oxide.

British Patent No. 2,290,488 describes a spark-ignited internal combustion engine having an emission control arrangement with a main catalytic converter and an upstream catalytic converter. The main catalytic converter is a conventional three-way catalytic converter with a washcoat containing cerium which serves as an oxygen accumulator. The upstream catalytic converter has an upstream zone with a washcoat that contains The upstream catalytic converter has an upstream zone with a washcoat that contains palladium but no cerium. The upstream zone is followed by a conventional three-way catalyst with a platinum and rhodium coating. The internal combustion engine is operated with a stoichiometric mixture, i.e. at $\lambda=1$. This catalytic coating arrangement makes the catalytic converter more stable as compared to arrangements subjected to rich and lean exhaust gas conditions rapidly fluctuating about $\lambda=1$. This exhaust emission control arrangement, however, is not useful in lean-burn internal combustion engines, such as lean mix Otto engines and Diesel engines, since such exhaust emission control devices are only stable with respect to aging at a theoretical air/fuel ratio $\lambda=1$.

Moreover, there are conventional $NO_X$ storage catalytic converters for lean-burn Otto engines which during lean operation initially store the nitrogen oxides up to a load limit which is dependent on the catalytic converter design. This is followed by a brief stoichiometric or slightly rich operation for regeneration of the $NO_X$ storage catalytic converter, after which lean burn operation is restored. The degree of $NO_X$ retention in these $NO_X$ storage catalytic converters is very high, i.e. the overall $NO_X$ reduction with accumulator discharge and $NO_X$ conversion at $\lambda \leq 1$ is >90% for lean-burn Otto engines in new condition. In principle, such $NO_X$ storage catalytic converters can also be used with Diesel engines, wherein a certain increase in the catalyst dimensioning is advantageous to allow for $SO_X$ storage. In contrast to Otto engines, however, Diesel engines always operate with excess air so that $\lambda>1$ during all operating states. Loading of the $NO_X$ storage catalytic converter is possible without any difficulty, but regeneration by enriching the exhaust gases, for example by injecting fuel into the exhaust line, would lead on the one hand to an intolerable increase in fuel consumption and on the other hand to a high oxidation heat due to the high oxygen content of the diesel exhaust since the injected fuel would be oxidized prior to the conversion of the stored $NO_X$. This results in the risk of destruction of the catalytic converter.

U.S. Pat. No. 5,406,790 discloses an exhaust emission control device for Diesel engines in which the $NO_X$ accumulator is shut off from the exhaust gas stream for regeneration. This takes place whenever the accumulator has reached its capacity. In order to avoid $NO_X$ emissions, the exhaust gas stream is directed to a second $NO_X$ accumulator during regeneration. Alternatively, the exhaust gas stream is throttled and a complicated regeneration algorithm is initiated. Functional reliability is problematic in this context. Moreover, duplication of the $NO_X$ accumulator involves considerable expense and good exhaust emission control is achieved only under certain conditions despite the cost.

In U.S. Pat. No. 4,755,499 reversible storage of nitrogen oxides and sulfur oxides, for instance from motor vehicle exhaust emissions, is described, wherein the absorbent is regenerated by heating in a reducing atmosphere. At the same time, a reduction of the nitrogen oxides occurs.

A storage catalyst of that type for use in motor vehicles is described in more detail in U.S. Pat. No. 5,402,641, in which high temperatures above 500° C. are necessary to regenerate the absorber. Consequently, use of the storage catalyst is possible only for motor vehicles having a high exhaust-gas temperature, in particular for motor vehicles with an Otto engine.

In this case, however, the possibility of use is limited since, under certain operating conditions of internal combustion engines, such as occur for example in city traffic, the acceleration phases cause a large emission of nitrogen oxide, but no long-lasting high temperature condition such as is required to regenerate the absorber, especially with respect to oxides of sulfur, is attained.

U.S. Pat. No. 5,473,887 discloses an Otto engine with an $NO_X$ storage catalyst as well as one three-way catalytic converter upstream and another three-way catalytic converter downstream from the storage catalyst. Due to the proximity of the upstream three-way converter to the engine, that converter heats up very quickly after a cold start so that it starts its catalytic activity promptly. After starting its catalytic activity, the upstream three-way catalytic converter converts the increasing quantities of HC and CO produced during the warming-up phase of the engine while reducing $NO_X$ at the same time. As a result, the $NO_X$ in the exhaust gas is reduced during a warming-up phase of the engine, even though the $NO_X$ accumulator has not yet achieved the temperature necessary for storage of $NO_X$. This arrangement and method make sense only for Otto engines since Diesel engines do not emit enough CO and HC to sufficiently reduce the $NO_X$ portion of the exhaust gases even during the warming-up phase. Except for the improved exhaust emission control during the warming-up phase, an Otto engine with an upstream catalytic converter does not demonstrate any better $NO_X$ reduction.

U.S. Pat. No. 5,473,887 also discloses two methods for $NO_X$ reduction in Diesel internal combustion engines, one based on throttling of the air supply to the engine and the other based on control of the fuel injection. Diesel internal combustion engines that are equipped with $NO_X$ accumulators as described above, however, show a definite reduction in $NO_X$ storage in the $NO_X$ accumulator at higher exhaust gas temperatures.

Common to all these methods and arrangements is that running a rich mixture in an internal combustion engine for regeneration of the $NO_X$ is often problematic, especially in direct-injection internal combustion engines and/or Diesel engines. Thus, in this context, the temperature of the exhaust gases can be too high on the one hand, or, on the other hand, the resultant reduction in output power can be too large.

Moreover, depending on the size of the $NO_X$ accumulator, flow-through can occur, that is some $NO_X$ flowing into the $NO_X$ accumulator is not absorbed even though sufficient storage capacity is available or some of the hydrocarbons that flow into the $NO_X$ accumulator for regeneration thereof exit from the $NO_X$ accumulator again.

SUMMARY OF THE INVENTION

Accordingly, it is an object of the present invention to provide an exhaust emission control method and arrangement which overcomes disadvantages of the prior art.

Another object of the invention is to provide a method and arrangement for exhaust emission control having an $NO_X$ accumulator which has a high affinity for $NO_X$ in the exhaust gases and/or a high conversion ability for hydrocarbon regeneration.

These and other objects of the invention are attained by providing an emission control method and arrangement in which exhaust gases are first contacted by an accumulator region having little or no noble metal content and thereafter are brought into contact with an accumulator or catalyst region having a higher content of noble metal.

In a typical embodiment of the invention, early use of the absorbent function after a cold start is possible even at very low exhaust gas temperatures as are present, for example, in direct-injection internal combustion engines. In addition, convenient regeneration of the $NO_X$ accumulator and economical and highly efficient conversion of the $NO_X$ and the hydrocarbons can be achieved even under a variety of operation conditions of the internal combustion engine.

In accordance with a first aspect of the invention, the $NO_X$ accumulator has little or no noble metal content in an upstream region and a down-stream region, either in the $NO_X$ accumulator and/or downstream of the $NO_X$ accumulator, has a relatively high noble metal content.

Since the exhaust gas is supplied to the $NO_X$ accumulator through a region with little or no noble metal content, it is particularly advantageous if the exhaust gas is first subjected to an NO to $NO_2$ conversion. This can take place, as described in detail hereinafter, at a converter upstream of the $NO_X$ accumulator and/or at an inlet region of the $NO_X$ accumulator.

In accordance with the present invention, it has been found that an $NO_X$ accumulator with little or no noble metal content has a better chemisorption rate and a higher storage capacity under otherwise constant conditions, such as exhaust gas velocity.

This emission control treatment is advantageously linked with a second aspect of the present invention, in accordance with which the $NO_X$ accumulator as a whole, or at least a section located upstream, has little or no oxygen storage ability, and the exhaust gas flows over an oxygen accumulator downstream of the $NO_X$ accumulator and/or following the section of the $NO_X$ accumulator having little or no oxygen storage ability.

By providing an oxygen accumulator in accordance with the invention either in a downstream region of the $NO_X$ accumulator or following it, flowthrough of CO and HC during regeneration of the $NO_X$ accumulator is reduced or avoided. The oxygen accumulator stores oxygen at $\lambda>1$, and releases it at $\lambda<1$. In other words, as soon as rich exhaust gas enters the $NO_X$ accumulator and reaches the oxygen accumulator region, the stored oxygen is released, while at the same time or subsequently oxidation of the CO and HC in the rich exhaust gas takes place. For this oxidation, an ordinary noble metal coating, in particular a platinum coating, is adequate, and a three-way catalyst coating such as platinum/rhodium is preferred. Preferably the noble metal coating is included in the oxygen accumulator but it can be in an additional section or, alternatively, can follow the oxygen accumulator.

Insofar as an $NO_X$ accumulator is present in combination with an oxygen accumulator in the exhaust gas stream, it is advantageous if a catalytic noble metal coating with little or no oxygen-storing ability, as compared to the oxygen accumulator, is located between these two accumulators. This catalytic coating can also have an $NO_X$ storage function, although it is advantageous if it has little or no $NO_X$ storage ability and little or no oxygen storage ability.

In a preferred embodiment of the present invention, the exhaust gas passes through at least four functional regions in the following sequence:

1. an NO to $NO_2$ converter region, e.g. an oxidation catalyst with a high platinum loading, for example 70 $g/ft^3$;
2. an $NO_X$ accumulator region with little or no noble metal coating and, in particular, with little or no oxygen storage ability, for example, alkali, alkaline earth and/or lanthanum on γ aluminum oxide;
3. a noble metal catalyst, in particular a three-way catalyst, with little or no $NO_X$ and/or oxygen storage ability;
4. a noble metal catalyst, in particular a three-way catalyst having an oxygen storage ability, for example, an aluminum oxide washcoat containing cerium.

The first of these regions is advantageously arranged close to the exhaust gas outlet from the internal combustion engine, and two or all three of the remaining regions can advantageously be provided on a common support material.

In accordance with the present invention, it has been shown that, in particular with the use of an $NO_X$ accumulator zone with little or no noble metal content, an exhaust gas velocity of 50,000 kg/h can be achieved, at which no drop in the conversion rate occurs, even when turbocharged engines are used. On the other hand, conventional $NO_X$ accumulators exhibit a significant drop in the $NO_X$ conversion rate at such high exhaust gas velocities.

In the $NO_X$ exhaust emissions control process in accordance with the invention, conventional $NO_X$ accumulators, such as are known from U.S. Pat. Nos. 5,402,641 and 5,473,887, for example, can be used. Typically, in these $NO_X$ accumulators, the average duration of the second set of operating conditions, for regeneration, is significantly shorter than that of the first set of operating conditions. As a result, the exhaust gas is lean for a relatively long period, for example, an average of 10 sec to 5 min, and rich or at $\lambda=1$ for a short period, for example, 0.1 to 5 sec, in particular 0.5 to 3 sec. Lean operation advantageously lasts at least twice as long and in particular at least three times as long as the regeneration operation.

In the exhaust emission control method for an internal combustion engine in accordance with the invention, the exhaust gases of the engine are supplied to an $NO_X$ accumulator that stores $NO_X$ from the supplied exhaust gas under a first set of operating conditions. The first operating conditions are specifically conditions in which net oxidizing conditions, i.e. $\lambda>1$ and preferably $\lambda>1.1$ exist in the exhaust, where the temperature of the exhaust gas stream should be above 150° C. and in particular above 200° C. Under a second set of operating conditions that is different from the first set of operating conditions, the $NO_X$ accumulator releases the stored $NO_X$ which is then reduced promptly and preferably immediately. The second operating conditions are those in which the exhaust gas includes an adequate quantity of reducing agent for the reduction of the stored nitrogen oxides. This is the case at an air/fuel ratio $\lambda \leq 1.05$ and in particular $\lambda \leq 1.0$.

Preferably in the exhaust gas emission control process in accordance with the invention, in contrast to conventional arrangements, there is not merely a simple sensing of the accumulator loading or of a time period so that regeneration of the $NO_X$ accumulator occurs when a certain accumulator loading is reached or after a predetermined period of time has elapsed. Instead, in accordance with the invention, the operating condition of the internal combustion engine is detected and regeneration, i.e. establishment of the second set of operating conditions, is deliberately carried out when the internal combustion engine is in a low load and/or a coasting phase and/or an idling phase. Regeneration is especially advantageous during coasting and is also advantageous during idling operation, and is advantageous to a lesser extent under low loading of the engine. Regeneration can take place during coasting operation of the internal combustion engine without any sacrifices in comfort, since no power output from the internal combustion engine is required. Establishment of the second set of operating conditions is also relatively without problems during idling operation, since no propulsive power is demanded of the internal combustion engine in this case as well but the establishment of the second set of operating conditions can result in a slight change in the idling speed of the engine. Comfortable regeneration of the $NO_X$ accumulator is likewise possible at low power output of the engine, since low output power values of the engine can still be established during the second set of operating conditions so that practically no reduction in the engine output power is noticeable to the driver.

In accordance with the above-mentioned advantageous order of the individual phases of the internal combustion engine during establishment of the second set of operating conditions, the establishment of the second set of operating conditions can also be weighted with regard to the individual phases. Thus, for example, a time control and/or a dependence on $NO_X$ emission of the internal combustion engine, i.e. the $NO_X$ storage level of the $NO_X$ accumulator, can be imposed during the regeneration. This means that the second operating conditions are only set when the first operating conditions have obtained for a certain pre-determined period or when a certain percentage storage level obtains. In this context, in turn, the time period or the percentage $NO_X$ loading of the $NO_X$ accumulator can be lower for coasting operation than for the idling or low power operating phases of the internal combustion engine.

Depending on how a motor vehicle with the exhaust emission control arrangement in accordance with the invention is used, it is possible that regeneration of the $NO_X$ accumulator can occur exclusively in coasting, idling and partial load phases. During long-duration high-load operation of the internal combustion engine, however, such as on a highway trip, regeneration outside of the favorable operating conditions can also occur if necessary, i.e., when the $NO_X$ accumulator has reached a certain $NO_X$ loading, for example of $\geq 80\%$ and especially $\geq 90\%$. When this occurs a noticeable drop in the power output of the internal combustion engine may occur, depending on the type of internal combustion engine and on the second operating conditions.

Low loading of the internal combustion engine in accordance with the foregoing is advantageously a load of up to 20% of the rated power of the internal combustion engine and especially up to 10% of the rated power. Moreover, during the second set of operating conditions the air supply to the internal combustion engine is preferably reduced, desirably by throttling in the air intake duct. This is possible in spark-ignited as well as self-ignition engines, and the method in accordance with the invention can be used to especially good advantage with self-ignition engines in particular, without requiring a second $NO_X$ accumulator for alternating operation as described in U.S. Pat. No. 5,406,790.

The method and arrangement in accordance with the invention preferably include an exhaust gas recirculation (EGR) system that has different exhaust gas recirculation rates in the first or the second set of operating conditions. In addition, the exhaust gas recirculation rate can also be changed as a function of load, even under the second set of operating conditions.

In a first embodiment of the invention, which is especially advantageous, the volume ratio of the recirculated exhaust gas to intake air is increased during a change from the first operating condition, i.e. lean operation of the internal combustion engine, to a second operating condition, i.e. regeneration of the $NO_X$ accumulator, so that the oxygen content in the combustion chamber of the internal combustion engine drops sharply. Upper and lower limits are set on the increase of the recirculated exhaust gas stream as a percentage by volume of the total intake, on the one hand so that combustion of the fuel in the combustion chamber of the internal combustion engine can take place at all, and, on the other hand to limit generation of soot. Depending on the operating conditions of the internal combustion engine, however, the volume fraction of the recirculated exhaust gas stream can be as high as 90%, as a general rule up to 80%. On the other hand, it is advantageous if the percentage by volume of the recirculated exhaust gas stream is not too low so that a significant reduction in the oxygen content in the combustion chamber is achieved. Thus, the percentage of exhaust gas should not be less than 15% and preferably not less than 30%. An exhaust gas percentage in the combustion chamber of 40% to 70% is most advantageous.

Raising the exhaust gas percentage during combustion achieves the effect that little or no intake air throttling is necessary in order to provide the reduced oxygen quantity in the combustion chamber for regeneration of the accumulator. This is particularly advantageous in Diesel engines, since it is hardly possible to provide a rich mixture even with throttling of the air intake.

Increasing the EGR rate is especially advantageous in a lower partial load region of the internal combustion engine, in particular below 20% of the rated power of the internal combustion engine. This type of EGR regulation is especially effective at a loading of the internal combustion engine up to 10% of the rated power. In contrast, a reasonable reduction in the amount of recirculated exhaust gas can be tolerated at higher loads on the internal combustion engine, especially to counteract a drop in power output of the internal combustion engine.

The foregoing aspect leads to a second embodiment of the invention in which the quantity of recirculated exhaust gas is reduced during a change from a first operating condition to a second operating condition. This takes place simultaneously with a reduction in the air supply to the engine so that the fill level of the combustion chambers of the internal combustion engine is lowered overall. The second process in accordance with the invention is characterized in that the power drop resulting from the reduction of fresh air supplied to the engine does not occur to such a marked degree. This is especially advantageous with Diesel engines in particular.

In addition to the EGR, the $NO_X$ reduction can be increased considerably if a converter that converts at least 50% of the NO contained in the exhaust gas stream into $NO_2$ at temperatures $\geq 230°$ C. is provided in the exhaust gas stream upstream of the $NO_X$ accumulator. Preferably the converter attains this degree of conversion at a temperature as low as $\geq 200°$ C. and desirably at a temperature $\geq 180°$ C. Customarily, such converters attain at least 90% conversion of the NO at a temperature $\geq 250°$ C. Alternatively, and preferably additionally, the $NO_2$/NO ratio in the exhaust gas from the Diesel engine is increased by the upstream converter, so that less NO is supplied to the subsequent accumulator, particularly during the warming up phase of the Diesel engine.

Any procedure that brings about an increase in the proportion of $NO_2$ in the nitrogen oxides, for example electrical discharges in the exhaust system, preferably barrier discharges, as well as catalytic processes, especially oxidation catalysts, is suitable for such $NO_X$ treatment. Among the latter, oxidation catalysts with an element of the platinum group, and preferably platinum itself, are particularly preferred. Such catalysts are well known as exhaust emission control catalysts for Diesel engines.

Preferably, the upstream converter is placed close to the exhaust outlet of the internal combustion engine, i.e., advantageously at a distance $\leq 1$ m and desirably at a distance of $\leq 70$ cm.

It is especially advantageous for the upstream converter to be a metal converter, i.e. the carrier for the catalytically active layer is made of a metal foil. Preferred in this context is a metal foil with a thickness of $\leq 50 \mu m$ and desirably with a thickness of $\leq 40 \mu m$, which ensures an especially rapid heating of the converter to its operating temperature. In addition, it has been established in accordance with the invention that the converter preferably should have a total volume of 10% to 25% and preferably of 15% to 20% of the displacement of the internal combustion engine, since optimum $NO_X$ control values can be achieved at this ratio. Moreover, the upstream converter preferably has a platinum loading of $\geq 60$ g/ft$^3$. In contrast, the absorption accumulator advantageously has a lower platinum loading, i.e. in particular $\leq 50$ g/ft$^3$ of platinum.

According to the invention, the usual gas absorbing materials may be employed, for example as described in U.S. Pat. No. 4,755,499, and also in U.S. Pat. Nos. 5,402,641 and 5,362,463. A common feature of all these storage materials is that they have an elevated absorption temperature, while a still higher regeneration temperature is required especially for removing the oxides of sulfur. For most storage media of this kind, temperatures in the range from 150° to 700° C., in particular temperatures above 300° C., are required.

The preferred $NO_X$ storage materials are distinguished in that, under conditions of net oxidation, i.e., a stoichiometric excess of oxidizing agents, such as occurs in the exhaust gas during the operation, they will store nitrogen oxides and, upon a reduction of the excess of oxygen, may reduce them. For this purpose, the $NO_X$ storage catalysts usually include a precious metal, in particular the usual precious metal coatings for three-way catalysts. The $NO_X$-laden storage material is advantageously regenerated in a regenerating phase at $\lambda \leq 1$.

Ordinarily, various reactions take place successively or simultaneously on the $NO_X$ storage catalyst, the most important reactions being: oxidation of the NO in the exhaust gas to $NO_2$; storage of the $NO_2$ as nitrate; decomposition of the nitrate; and reduction of the re-formed $NO_2$ to nitrogen and oxygen.

As described above, the course of the reactions depends, among other things, not only on the temperature of the catalyst but also on the concentration of the reagents at the active region of the catalyst and the flow velocity of the gas.

With various factors capable of being combined with each other, it is possible also, at little cost, to optimize the known exhaust-gas absorbers so that they may be employed for internal combustion engines with direct injection Diesel engines. For this purpose, the wall thickness of the supporting member on which the absorption layer is applied preferably should be $\leq 160$ microns, and desirably $\leq 140$ microns and if a metal support is used, a wall thickness $\leq 50$ microns, preferably $\leq 40$ microns, and desirably $\leq 30$ microns, and the absorber should preferably be heated to a temperature above the temperature of the exhaust gas.

It has been found that, with the use of thin-walled ceramic supports for the absorption layer, i.e., supporting members having a wall thickness $\leq 0.14$ mm, not only is a more rapid temperature rise of the absorption layer possible, but also a thicker absorption layer may be used. This accomplishes two objectives: in the first place, even short periods of high-temperature operation can be utilized for regeneration since the storage layer temperature will be increased to the required temperature more quickly, and in the second place, by providing a thicker absorption layer, a higher storage capacity can be achieved so that during operation of the internal combustion engine a longer period of time can elapse before the storage layer must be regenerated. Consequently, despite the less frequent occurrence of temperature peaks in the exhaust gas of consumption-optimized internal combustion engines, no failure of the storage layer resulting from exceeding its storage saturation limit will occur.

Absorbers having a support member made of metal foil are especially suitable, and the metal foil may advantageously be connectable to an electric power source for resistance heating so that, even at low exhaust gas temperatures, the absorber can be brought to the necessary regenerating temperature by passing an electric current through the metal support. Furthermore, by using a metal support member, the gas passages which are coated with the absorption layer may be variously shaped, so that, for example, a controlled turbulent flow vortex of the exhaust gas in the passages can be established.

To produce especially good oxide gas conversion, the absorption layer has an enlarged surface area, that is, a total surface area that is substantially larger than the area of the surface of the support member on which it is coated. For this purpose, the absorption layer provides a surface area of at least 20 m$^2$/g, and preferably at least 40 m$^2$/g. Also, the absorption layer preferably has a pore volume of at least 0.2 cm$^3$/g, and desirably at least 0.4 cm$^3$/g, a bimodal pore size distribution with both micro pores and macro pores also being acceptable. This may be achieved for example by the choice of the size of the particles forming the absorber surface, in which mixtures or specified distributions of different particle sizes are also suitable.

An especially suitable absorption material is gamma-aluminum oxide containing one or more elements in the group consisting of alkali metals, alkaline-earth metals, rare earths and/or lanthanum. The presence of the elements copper and manganese is also suitable. The added elements are usually present as oxides, or else as carbonates or nitrates, the storage effects being achieved by formation of corresponding nitrates and sulfates, which are then converted back to oxides or carbonate under the appropriate reaction conditions. In this way, it is possible to absorb $NO_X$ and/or $SO_X$ from an exhaust gas containing at least 1% oxygen.

As described above, the absorbed substances are desorbed from the storage catalyst layer by elevated temperatures and in a reducing atmosphere. For this purpose, it is desirable to determine the oxygen concentration in the exhaust gas so that the oxygen concentration, or a quantity having a known relationship to the oxygen concentration, can be utilized to control the process of absorption or desorption.

Since the temperature of the absorption layer, determined directly or indirectly, is also important the same consideration is also applicable to the temperature of the exhaust gas. Thus, the absorption layer temperature may for example be determined by measuring the temperature of the exhaust gas or of the support member. A determination of temperature over the operating diagram of the internal combustion engine is also possible.

Preferably absorption layers having an average cross-section thickness of at least 50 microns, desirably at least 70 microns, and most desirably at least 90 microns, are used. Such thickness values provide a higher storage capacity than conventional storage layers and thus increase the time interval before regeneration of the layer is required. These thickness values apply to ceramic supports and half these thicknesses are appropriate for metal supports. The specified thickness values should extend over at least 50% and preferably 80% of the absorption layer.

Since the release and conversion of the $NO_X$ from the storage layer and the release of the oxides of sulfur from the storage layer require different temperatures, higher in the case of the sulfur oxides, it is also possible to proceed so that a desorption of the oxides of sulfur, which are present in particular as sulfate, is performed at longer time intervals or only as needed, so that the storage layer is only occasionally heated to the high temperatures needed for desorption of the sulfur oxides. This counteracts premature aging of the storage layer, so that an especially good long-term stability of the absorber is achieved. The Diesel engine emission control arrangement described herein preferably includes the foregoing features.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
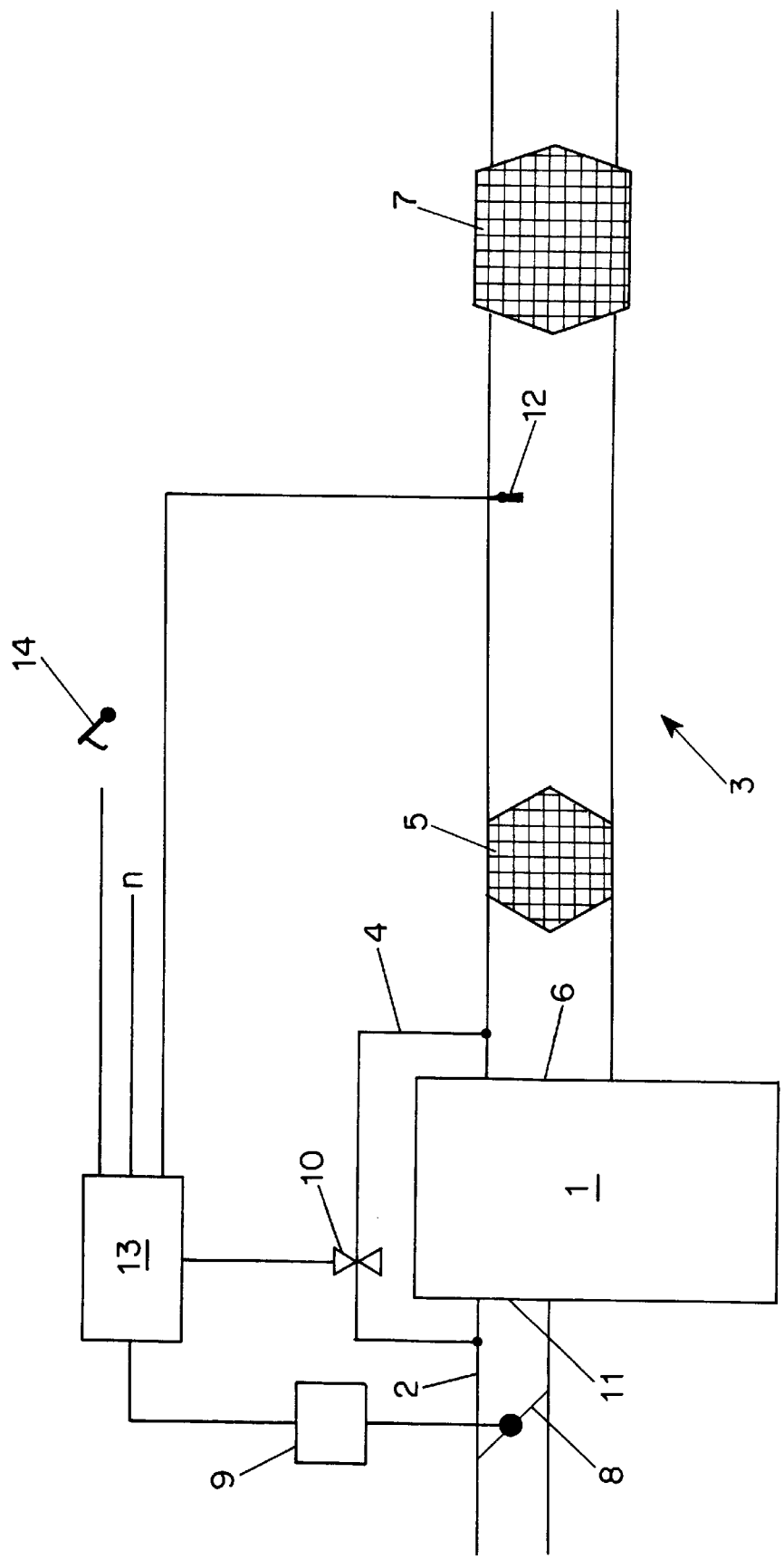
FIG. 1 is a schematic diagram illustrating a representative embodiment of a Diesel engine having an exhaust emission control arrangement with exhaust gas recirculation.

In the typical embodiment shown in FIG. 1, a direct injection, 4 cylinder Diesel internal combustion engine 1 having a 1.9 liter displacement, providing 66 kW power has an air intake duct 2 and an exhaust duct 3. An exhaust gas recirculation line 4 extends from the exhaust duct 3 to the air intake duct 2 to produce a reduction in raw $NO_X$ emissions.

Mounted close to the Diesel engine in the exhaust duct 3 is a catalytic converter 5 that has a volume of 15% of the displacement of the engine 1. The distance between the engine exhaust gas outlet 6 and the converter 5 is approximately 20 cm. Also located in the exhaust system 3, approximately 70 cm downstream from the converter 5, is a conventional $NO_X$ storage catalyst 7 from which the purified exhaust gases are released to the atmosphere.

The converter 5 has a metal foil carrier body which is coated with a γ aluminum oxide wash coat having a platinum loading of 70 g/ft$^3$. The $NO_X$ storage catalyst 7 is a honeycomb ceramic support member to which a γ aluminum oxide wash coat with barium, lanthanum and sodium has been applied. The storage catalyst wash coat which is described in more detail hereinafter.

The air inlet channel 2, upstream of the outlet of the exhaust gas recirculation line 4, has a throttle valve 8 that can be opened and closed by a servomotor 9. In addition, the exhaust gas recirculation line 4 has a control valve 10 by which the quantity of exhaust gas recirculated from the exhaust system 3 to the air intake 11 of the engine 1 can be controlled.

Moreover, a broad band lambda probe 12 is inserted ahead of the $NO_X$ accumulator 7 in the exhaust system 3 by which it can be determined whether the exhaust gas in the exhaust system 3 has excess oxygen, is balanced or is rich. The signals from the broad band lambda probe 12 are supplied to a control unit 13, which in turn controls the servomotor 9, the air inlet throttle 8 and the control valve 10 in the exhaust gas recirculation system 4. Furthermore, the control unit 13 receives additional signals relating to operation of the engine such as the engine speed n and a load signal, for example from an accelerator pedal 14.

In normal operation of the engine 1, the throttle valve 8 is fully open and, when the exhaust gas temperature is approximately ≧150° C., the $NO_X$ accumulator 7 stores primarily $NO_2$ that is present in the exhaust gases from the engine 1 or from oxidation of NO from the exhaust gas in the converter 5. During operation of the engine under the first set of operating conditions with a lean fuel mixture, the nitrogen oxide values of the exhaust gas stream, and thus the nitrogen oxide filling of the $NO_X$ accumulator 7, are determined by the control unit 13 based on engine performance characteristics and the received engine data. When the vehicle is coasting or the engine is idling with approximately 20% filling of the $NO_X$ accumulator with $NO_2$ or operating in a lower partial load range with approximately 50% filling of the accumulator with $NO_2$, regeneration of the $NO_X$ accumulator 7 is initiated by the control unit 13. For this purpose, the throttle valve 8 is partially closed so that the fresh air supply to the air intake 11 is sharply reduced. At the same time, the control valve 10 is opened so that a high exhaust gas recirculation rate is achieved. This causes the engine to operate with an undersupply of oxygen, i.e., a rich mixture, for which purpose the quantity of fuel injected into the combustion chamber of the engine 1 can also be increased if necessary.

Any oxygen remaining in the exhaust gas stream during the regeneration phase under the second set of operating conditions is converted with the HC and CO emissions in the exhaust stream by the converter 5 so that an oxygen-free exhaust gas, which is monitored by the broad band lambda probe 12, is available at the inlet of the $NO_X$ accumulator 7. Nitrogen oxides stored in the $NO_X$ accumulator 7 are converted on the noble metal of the $NO_X$ accumulator, in particular with the CO emissions still present in the exhaust gas stream, but also by the HC residues. After a few seconds, the $NO_X$ accumulator 7 is regenerated and the control unit 13 again returns the throttle valve 8 and the control valve 10 to the positions required for the first set of engine operating conditions.

With the increase in the EGR, no overheating of the exhaust gases of the internal combustion engine takes place, so that on the one hand the converter 5 and the $NO_X$ accumulator 7 are protected against high temperatures and, on the other hand, a reduced fuel quantity is needed for the regeneration of the $NO_X$ accumulator 7.

Figure 2:
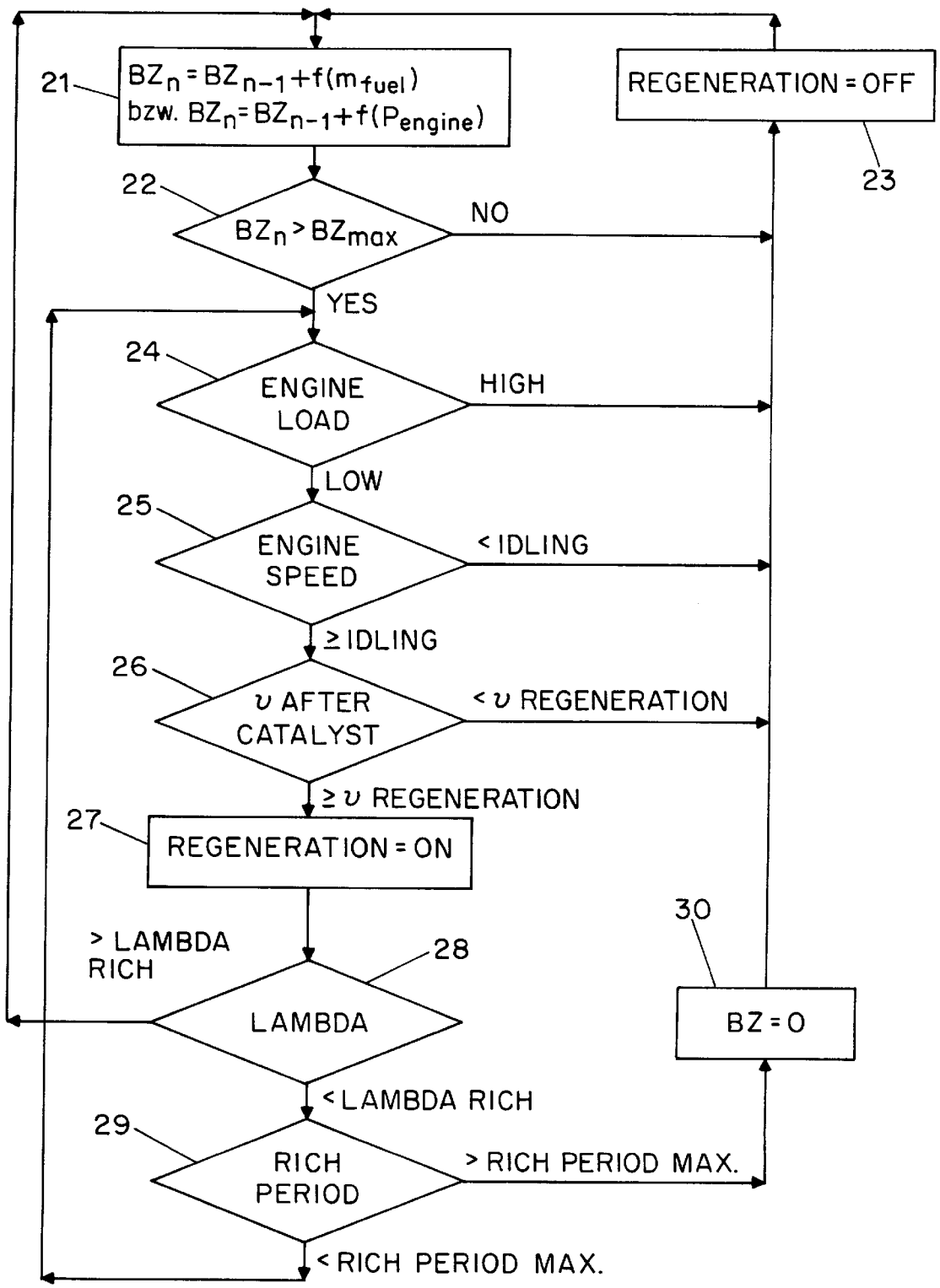
FIG. 2 is a schematic flow diagram illustrating the steps for regeneration of an $NO_X$ storage catalytic converter.

The steps in the above-described regeneration sequence are set forth in greater detail in FIG. 2. The decision of when to start regeneration is primarily guided by the factors of: $NO_X$ loading of the accumulator; operating condition of the engine; and temperature of the $NO_X$ accumulator.

After regeneration of the $NO_X$ accumulator 7, a loading counter 30 is set to zero in a first step 21. The $NO_X$ reloading of the emptied accumulator 7 can be measured directly by detecting the difference between signals from two $NO_X$ sensors, one before the accumulator and one after it, or indirectly, and thus less expensively, in an approximate fashion by analysis of engine operating data. In accordance with U.S. Pat. No. 5,473,881, the loading state of the accumulator can also be derived from the accumulated engine revolutions since the last regeneration. However, it is preferable to measure the accumulated engine power output which can be determined from the position of the gas pedal 14 and the engine speed n. Somewhat less precisely, it is also possible to add up the fuel quantity consumed by the engine since the last regeneration. Since the $NO_X$ storage rate of the $NO_X$ accumulator is also determined in large part by the accumulator temperature, which can be determined by a temperature sensor in the exhaust gas stream or in the accumulator, or even through performance characteristics, and by the exhaust gas velocity, which can be calculated approximately from the engine speed and the quantity of fuel injected, these values should also be taken into account in calculating the $NO_X$ accumulator loading. A deviation of up to ±30% from the actual total loading is tolerable since the loading capacity of the $NO_X$ accumulator initially decreases only slightly with increasing total loading, and a regeneration of an accumulator which is only approximately three-quarters full involves no significant disadvantages.

In the next step 22, the loading state BZ of the $NO_X$ accumulator is detected, and when the loading state is low, operation is continued in the first operating condition "regeneration off" as indicated by step 23. When a predefined maximum loading state is exceeded the engine load is sensed at step 24. If a zero position of the gas pedal 14 is detected, the engine speed 25 is detected in the next step. As long as an engine load is present, the loop through "regeneration off" 23 and the sensing of the loading state 22 is followed again, and as the loading of the $NO_X$ accumulator 7 increases, an increasing engine load is also interpreted as low load so that a full accumulator 7 is regenerated even at a higher engine load. This sensing is carried out because regeneration, for example by throttling of the air supply, raising of the EGR rate and/or a higher quantity of injected fuel, is accompanied by a drop in power of the internal combustion engine 1. For this reason, regeneration should be carried out as soon as possible at loads up to moderate partial loads.

The engine speed sensing step 25 is intended to prevent stalling of the engine at a speed below the idling speed. As long as the speed n of the engine 1 is high enough, a switchover to temperature sensing 26 takes place. Since accumulator re-generation is dependent on a temperature at which CO reacts with $NO_2$ on the noble metal of the accumulator, which is approximately 180°, the accumulator temperature should be above this reaction threshold. Depending on the accumulator material, this minimum temperature may have a different value.

If all the mentioned criteria are met, regeneration is initiated by operating the throttle 8 and/or opening the EGR valve 10 and/or increasing the quantity of injected fuel during step 27. At the same time, a sensing step 28 to determine whether the exhaust gas is rich takes place by using the lambda probe 12, for which a certain amount of time is needed. As long as the sensing step 28 yields a lambda above 1, i.e. rich exhaust gas, a continued summing of the $NO_X$ values of the exhaust gas takes place in step 21 with an appropriate sensing sequence. If the exhaust gas is found to be rich by the lambda probe 12, it can be assumed that regeneration of the accumulator 7 is occurring. The regeneration can be terminated after the regeneration step 29 has been completed when the lambda value drops below a selected threshold value which indicates a rich exhaust gas. Before the rich exhaust gas operation period has been completed, the sensing cycle at the engine load 24 is started repeatedly. After the rich operation period has finished, the accumulator loading counter 30 is reset to zero in step 21.

Certain detection of a rich exhaust gas occurs at a lambda value of approximately $\leq 0.9$ but values from <1.05 all the way to 0.6 are possible. For calculating the regeneration period, loading of the accumulator and the supply of reducing agents are critical. CO is the main reduction component in accumulator regeneration during rich operation where 2 moles of CO are needed for the conversion of 1 mole of $NO_2$, corresponding to 1.22 g CO per gram of stored $NO_2$.

Hence, the necessary minimum regeneration period can be calculated as a function of the CO supply from the engine throttled to produce a low lambda. With increasing throttling, the CO supply of the engine also increases, and the minimum regeneration period decreases. To ensure complete emptying of the $NO_X$ accumulator, the minimum regeneration period can be corrected upwardly by 50%, preferably by 20% to 40%, and desirably by about 30%. Depending on the internal combustion engine used and the reducing agent mixture, e.g., HC, CO, $H_2$, present in the exhaust gas, the accumulator temperature, the exhaust gas velocity, the storage medium, the washcoat, the inflow relationships and the catalyst volume, the time correction factor can be from −50% to +300%. Accordingly, the time correction factor should be determined experimentally.

Preferably, hysteresis can be employed during the sensing in order to avoid a frequent switching back and forth between the "regeneration on" and "regeneration off" states. The hysteresis can advantageously be present in the engine load, the engine speed and the accumulator temperature. The degree of overlap here is governed by the motor vehicle configuration and can advantageously be, for example, ±5% of the set point, but values of up to ±30% are possible.

Figure 3:
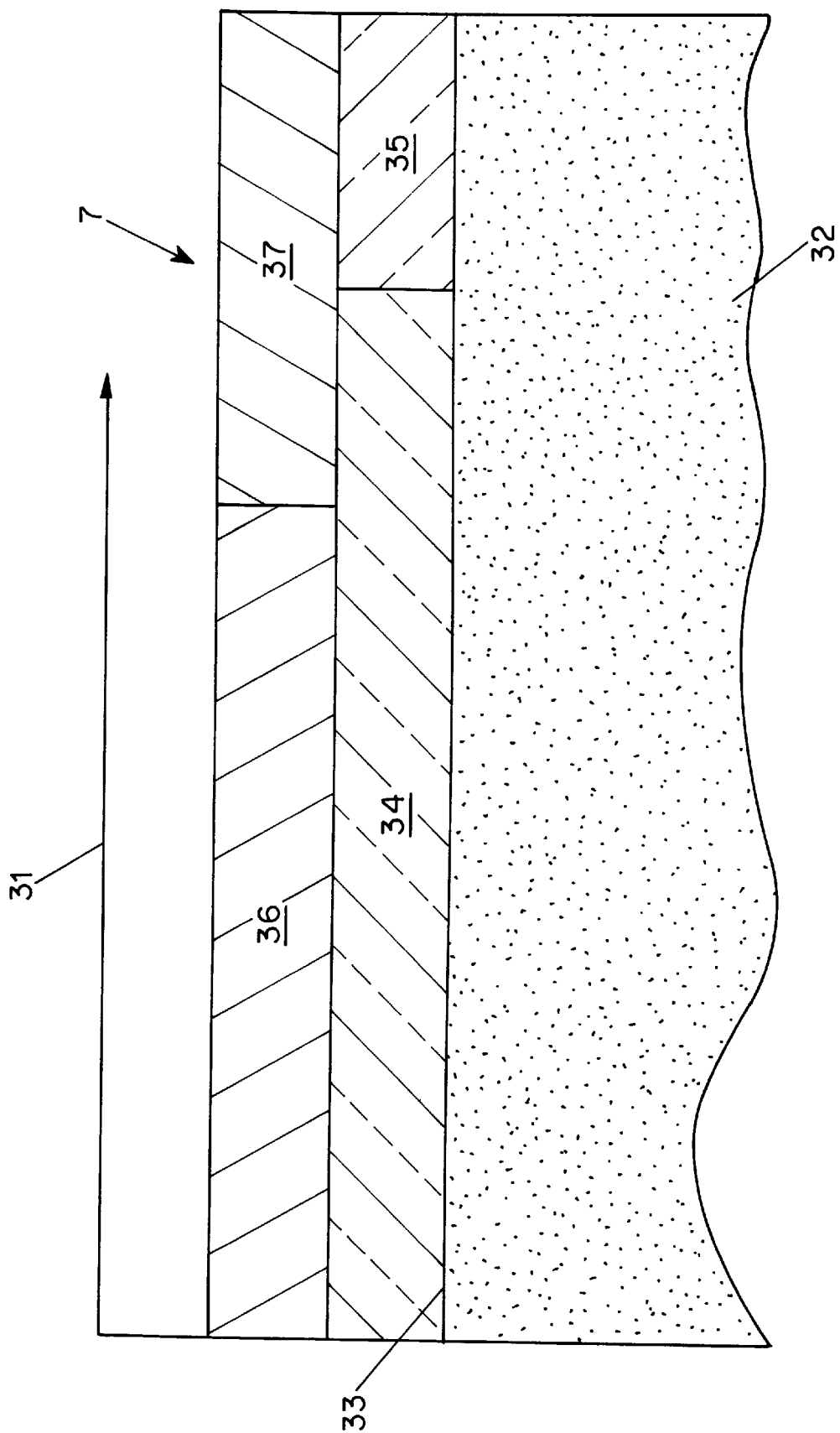
FIG. 3 is a schematic fragmentary cross-sectional view of an $NO_X$ storage catalytic converter surface.

The $NO_X$ storage catalytic converter 7 schematically illustrated in greater detail in the fragmentary view of FIG. 3 is a three-zone catalytic converter with coatings 34–37 shown in a cross-section through a flow channel. The arrow 31 indicates the direction of flow of the exhaust gas.

The $NO_X$ accumulator 7 includes a honeycomb-shaped ceramic carrier 32, having a surface 33 on which an upstream washcoat 34 and downstream washcoat 35 are applied. The upstream washcoat layer 34 contains primarily γ aluminum oxide, as is described, for example, in U.S. Pat. No. 2,290,488. The downstream washcoat layer 35 has the same structure but it additionally contains cerium in the form of cerium oxide, with a cerium content preferably amounting to at least 1 g/ft$^3$ and desirably in the range from 3 g/ft$^3$ to 8 g/ft$^3$. By providing the upstream converter 5, the storage catalytic converter 7 can be constructed with an upstream coating region 36 containing little or no noble metal content, for example up to 40 g/ft³ and in particular up to 20 g/ft³. In this way, the chemisorption rate of the $NO_X$ accumulator is increased. For the absorption of $NO_X$, in particular $NO_2$, the washcoat 34 in the upstream section 36 (which is shown on top of the washcoat 34 in the drawing, but in actuality is contained therein) contains barium, lanthanum and sodium, which, during loading of the $NO_X$ accumulator 7, form the appropriate nitrates with the $NO_2$ of the exhaust gas, and are reconverted to the appropriate oxides under the second set of operating conditions.

In the downstream section of the $NO_X$ accumulator 7 which corresponds to a conventional three-way catalyst coating, a noble metal coating 37 is applied on the washcoat layers 34 and 35.

The noble metal in this case has a conventional particle diameter of 0.1 n to 10 n, in particular around 1 n. Preferably platinum or a mixture of platinum with at least one of the elements rhodium and palladium is used as the noble metal. If desired, the $NO_X$ accumulating coating 36 can also extend without harm into the layers located downstream so that the manufacture of the $NO_X$ accumulator 7 is noncritical. The coating 37 advantageously has a noble metal content in the range from 30 g/ft³ to 100 g/ft³, and in the illustrated example it has 46 g/ft³ of noble metal.

In the described structure, there are three regions in the $NO_X$ accumulator 7: an upstream region with $NO_X$ accumulator material plus a normal washcoat; a middle region with noble metal plus a normal washcoat; and a downstream region with noble metal plus an oxygen-storing washcoat.

The oxygen stored in the oxygen-storing washcoat 35 oxidizes residual quantities of CO and HC that have not been converted with $NO_X$ and which flow into the $NO_X$ accumulator 7 along with exhaust gas during the second set of operating conditions and which, in themselves, serve the purpose of reducing $NO_X$ while being converted into $CO_2$ and water so that CO and HC flowthroughs during regeneration are largely avoided.

Figure 4:
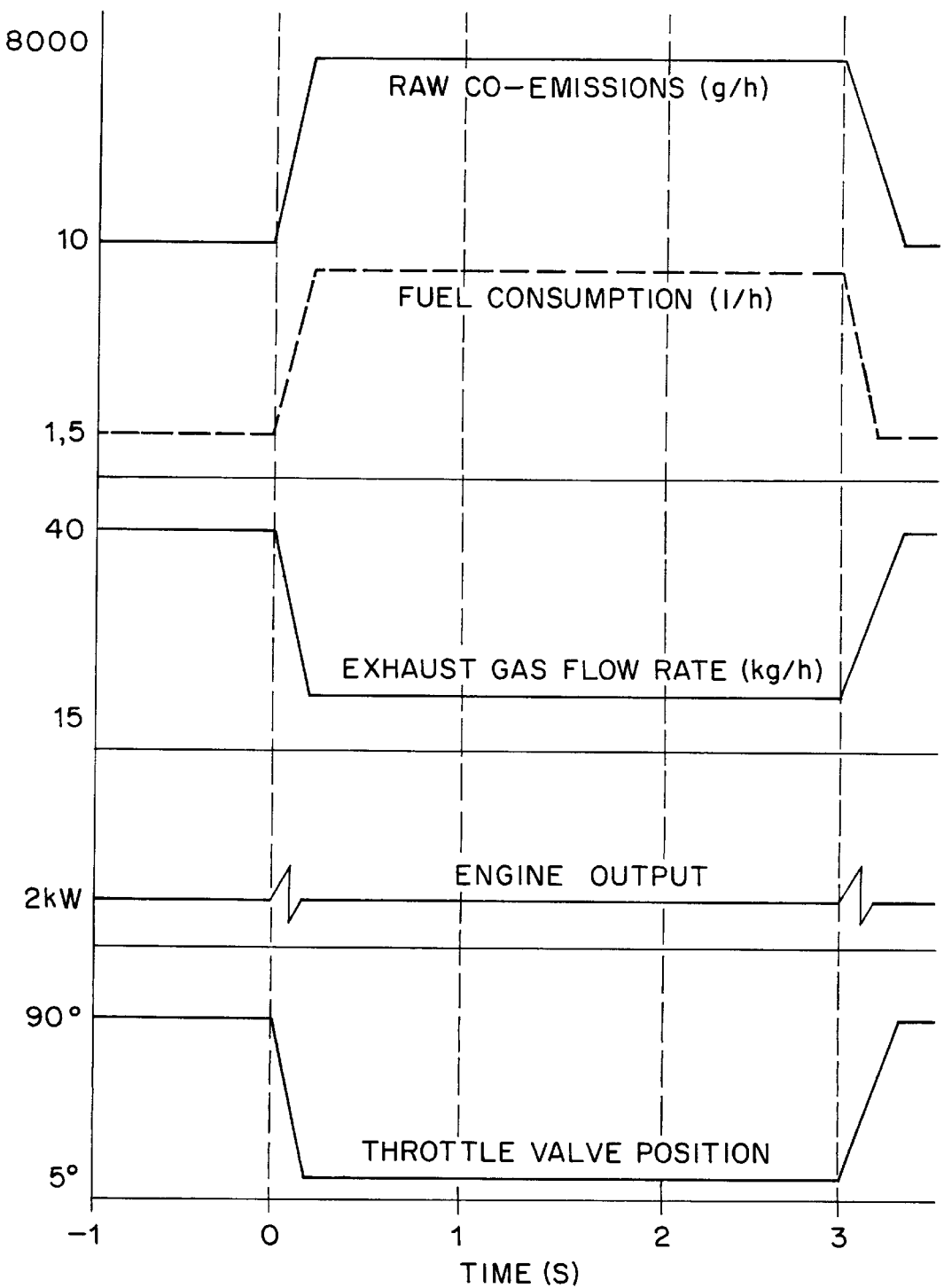
FIG. 4 is a schematic graphical representation showing individual engine characteristics.

The graphical illustration of FIG. 4 shows the individual interrelationships at the Diesel engine 1 during changes between the two sets of operating conditions. The first operating conditions apply up to the time 0 sec and after the time 3 sec and the duration of the first set of operating conditions customarily is in the range from 30 sec to 2,000 sec. During operation with the second set of operating conditions in the region from 0 sec to 3 sec, the throttle valve 8 is closed from its open position (90°) to approximately 5°, i.e. it is almost completely closed. At the same time, an increase takes place in fuel injection from 1.5 l/h to 10 l/h, by which the raw CO emissions are increased from 10 g/h to 8,000 g/h while the engine output remains more or less unchanged at approximately 2 kW. At the same time, the mass flow rate of the exhaust gas drops from 40 kg/h to 15 kg/h.

Although the invention has been described herein in conjunction with specific embodiments, many modifications and variations therein will readily occur to those skilled in the art. Accordingly, all such variations and modifications are included within the intended scope of the invention.

I claim;:

1. An emission control method for a self-igniting internal combustion engine comprising:

supplying exhaust gases from a self-igniting internal combustion engine to an $NO_X$ accumulator that is suitable for storing $NO_X$ from the supplied exhaust gas under a first set of operating conditions, and from which, under a second set of operating conditions, the stored $NO_X$ is released for reduction of the $NO_X$ with little or no noble metal in the $NO_X$ accumulator; and thereafter bringing the exhaust gases into contact with a higher content of a noble metal in the $NO_X$ accumulator or in a downstream catalytic converter.

2. A method in accordance with claim 1 wherein the exhaust gases are brought into contact with an $NO_X$ accumulator region having little or no capacity for oxygen storage, and the exhaust gases are thereafter brought into contact with an accumulator region having a higher capacity for oxygen storage either in the $NO_X$ accumulator or in a downstream region.

3. An emission control method for an internal combustion engine comprising:

supplying exhaust gases from an internal combustion engine to an $NO_X$ accumulator that is suitable for storing $NO_X$ from the supplied exhaust gas under a first set of operating conditions, and from which, under a second set of operating conditions, the stored $NO_X$ is released for reduction of the $NO_X$;

bringing the exhaust gases into contact with an $NO_X$ accumulator region having little or no capacity for oxygen storage; and thereafter bringing the exhaust gases into contact with an accumulator region having a higher capacity for oxygen storage either in the $NO_X$ accumulator or downstream.

4. A method in accordance with claim 1 or claim 3 wherein the exhaust gases are conducted through at least three different treatment zones, including a first zone that is in the $NO_X$ accumulator and has little or no noble metal, a second zone that is in the $NO_X$ accumulator and has more noble metal than the first zone, and a third zone that is in the oxygen accumulator and has a noble metal coating.

5. A method in accordance with claim 4 wherein the exhaust gas flows through a zone preceding the third zone which has little or no $NO_X$ storage capacity and which contains more noble metal than the first zone and has a lower oxygen storage capacity than the third zone.

6. A method in accordance with claim 4 wherein at least two of the treatment zones are in one carrier body.

7. A method in accordance with claim 1 or claim 3 wherein the second set of operating conditions are established when there is at least one condition selected from the group consisting of: low loading; coasting; and idling, of the internal combustion engine.

8. A method in accordance with claim 1 or claim 3 wherein the average length of time of the duration of the first set of operating conditions is a multiple of the average length of time of the duration of the second set of operating conditions.

9. A method in accordance with claim 1 or claim 3 wherein the second set of operating conditions is dependent upon the $NO_X$ accumulator loading.

10. A method in accordance with claim 1 or claim 3 wherein the second set of operating conditions are established only when the $NO_X$ loading of the $NO_X$ accumulator exceeds a predetermined level.

11. A method in accordance with claim 1 or claim 3 wherein a partial stream of the exhaust gases is supplied through an exhaust gas recirculation system to an air intake of the internal combustion engine and including the step of establishing an exhaust gas partial stream/intake air ratio under the first set of operating conditions, and increasing the exhaust gas partial stream/intake air ratio under the second set of operating conditions.

12. A method in accordance with claim 11 wherein the increase in the exhaust gas partial stream/intake air ratio occurs only in a lower partial load operating region of the internal combustion engine.

13. A method in accordance with claim 1 or claim 3 including the step of reducing the intake of air to the internal combustion engine under the second set of operating conditions.

14. A method in accordance with claim 1 or claim 3 wherein the internal combustion engine includes a direct fuel injection system.

15. A method in accordance with claim 1 or claim 3 wherein the internal combustion engine is a Diesel engine.

16. A method in accordance with claim 1 or claim 3 wherein the exhaust gases before being supplied to an $NO_X$ accumulator region having little or no noble metal under the first set of operating conditions are passed through a converter in which an $NO_2/NO$ ratio present in the exhaust gases is increased and/or in which, at a temperature $\geq 230°$ C., at least 50% of the NO contained in the exhaust gas supplied is converted into $NO_2$.

17. A method in accordance with claim 1 or claim 3 wherein the reduction of the stored $NO_X$ takes place at a $\lambda \leq 1.05$.

18. A method in accordance with claim 1 or claim 3 wherein the $NO_X$ accumulator contains an aluminum oxide.

19. A method in accordance with claim 18 wherein the aluminum oxide is γ aluminum oxide.

20. A method in accordance with claim 1 or claim 3 wherein the $NO_X$ accumulator contains an element from the group consisting of alkali metals, alkaline earth metals, rare earths, lanthanum, titanium, copper and manganese.

21. A method in accordance with claim 1 or claim 3 wherein the $NO_X$ accumulator absorbs $NO_X$ and $SO_X$ from the exhaust gases when there is an oxygen excess in the exhaust gases.

22. A method in accordance with claim 1 or claim 3 wherein the $NO_X$ accumulator releases at least one of $NO_X$ and $SO_X$ in one of: a reducing atmosphere; and an atmosphere with low oxygen concentration.

23. A method in accordance with claim 1 or claim 3 wherein an oxygen concentration determining device provides a signal representing the oxygen concentration as an input to a control unit which establishes the first or second set of operating conditions.

24. A method in accordance with claim 23 wherein the control unit receives signals representing both the oxygen concentration and the exhaust gas temperature as input signals.

25. A method in accordance with claim 1 or claim 3 wherein the $NO_X$ accumulator releases at least one of $NO_X$ and $SO_X$ at high temperatures.

26. A method in accordance with claim 25 wherein a temperature determining device provides a signal representing the temperature of the exhaust gases or of the $NO_X$ accumulator.

27. A method in accordance with claim 26 wherein the control unit receives signals representing both the oxygen concentration and the exhaust gas temperature as input signals.

28. An internal combustion engine comprising an engine having an exhaust system and an $NO_X$ accumulator in the exhaust system which is suitable for storing $NO_X$ from exhaust gases under a first set of operating conditions, and from which the stored $NO_X$ can be released under a second set of operating conditions for reduction of the $NO_X$ wherein the $NO_X$ accumulator includes at least a first region having little or no noble metal and including a second region in the exhaust system downstream from the first region having a higher content of a noble metal than the first region.

29. An internal combustion engine in accordance with claim 28 wherein the $NO_X$ accumulator has little or no oxygen storage capacity in a third region and wherein the exhaust system includes an oxygen accumulator in a fourth region downstream of a third region which works in cooperation with an oxidation catalyst.

30. An internal combustion engine comprising an engine having an exhaust system, an $NO_X$ accumulator in the exhaust system which is suitable for storing $NO_X$ from exhaust gases under a first set of operating conditions, and from which the stored $NO_X$ can be released under a second set of operation conditions for reduction of the $NO_X$, wherein the $NO_X$ accumulator contains a first region with little or no oxygen storage capacity and, including a second region downstream from the first region containing an oxygen accumulator which works in cooperation with an oxidation catalyst.

31. An internal combustion engine comprising an engine having an exhaust system, at least three exhaust gas treatment regions in the exhaust system including an $NO_X$ accumulator, a first region in the $NO_X$ accumulator containing little or no noble metal, a second region in the $NO_X$ accumulator downstream from the first region containing more noble metal than the first region, and a third region in the exhaust system downstream from the second region containing an oxygen accumulator with a noble metal coating.

32. An internal combustion engine in accordance with claim 31 including a fourth region downstream from the first region and upstream from the third region which has little or no $NO_X$ storage capacity and little or no oxygen storage capacity and which has a higher noble metal content than the first region.

33. An internal combustion engine in accordance with one of claims 28, 30 or 31 wherein a plurality of the exhaust gas treatment regions are arranged on one carrier.

34. An internal combustion engine in accordance with one of claims 28, 30 or 31 including a throttle in an air intake for the internal combustion engine and upstream of the outlet from an exhaust gas recirculation system by which the quantity of air flowing to the air intake of the internal combustion engine can be changed.

35. An internal combustion engine in accordance with one of claims 28, 30 or 31 including a converter which has an overall volume in the range from 10% to 25% of the displacement of the engine and which contains at least 60 g/ft³ of platinum and is located between the $NO_X$ accumulator and an exhaust gas outlet from the internal combustion engine.

36. An internal combustion engine in accordance with one of claims 28, 30 or 31 including a direct fuel injection unit in the engine.

37. An internal combustion engine in accordance with one of the claims 28, 30 or 31 wherein the engine is a Diesel engine.

* * * * *